United States Patent
Schnappauf et al.

(10) Patent No.: US 12,447,944 B2
(45) Date of Patent: Oct. 21, 2025

(54) CONTROLLER FOR OPERATING A ROAD-COUPLED HYBRID VEHICLE

(71) Applicant: Bayerische Motoren Werke Aktiengesellschaft, Munich (DE)

(72) Inventors: Florian Schnappauf, Hattenhofen (DE); Andreas Treffler, Adelzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 87 days.

(21) Appl. No.: 18/277,120

(22) PCT Filed: Apr. 13, 2022

(86) PCT No.: PCT/EP2022/059826
§ 371 (c)(1),
(2) Date: Aug. 14, 2023

(87) PCT Pub. No.: WO2022/238078
PCT Pub. Date: Nov. 17, 2022

(65) Prior Publication Data
US 2024/0123968 A1 Apr. 18, 2024

(30) Foreign Application Priority Data
May 12, 2021 (DE) .................. 10 2021 112 481.6

(51) Int. Cl.
*B60W 20/10* (2016.01)
*B60W 30/18* (2012.01)

(52) U.S. Cl.
CPC ...... *B60W 20/10* (2013.01); *B60W 30/18063* (2013.01); *B60W 2510/0275* (2013.01);
(Continued)

(58) Field of Classification Search
CPC .......... B60W 20/10; B60W 30/18063; B60W 2510/0275; B60W 2510/105;
(Continued)

(56) References Cited

U.S. PATENT DOCUMENTS

2003/0034188 A1* 2/2003 Gotou .................. B60W 20/40
903/917
2006/0180374 A1 8/2006 Billig et al.
(Continued)

FOREIGN PATENT DOCUMENTS

DE 103 46 671 A1 5/2005
DE 10 2008 035 451 A1 3/2009
(Continued)

OTHER PUBLICATIONS

International Search Report (PCT/ISA/210) issued in PCT Application No. PCT/EP2022/059826 dated Aug. 8, 2022 with English translation (4 pages).
(Continued)

*Primary Examiner* — Brian P Sweeney
(74) *Attorney, Agent, or Firm* — Crowell & Moring LLP

(57) ABSTRACT

A control device is provided for operating a road-coupled hybrid vehicle, which is equipped with an electronic control unit, a first drive unit paired with a primary axle, and a second drive unit paired with a secondary axle. The control unit is designed to receive input variables including a specified sum target creep torque and a command to switch over from the single-axle operation to the two-axle operation with a specified all-wheel factor. The control unit sets a specified target torque for an internal combustion engine of
(Continued)

the primary axle according to the all-wheel factor and detects the resulting actual coupling torque of the automatic transmission. If the functional module of the control unit ascertains a difference between the actual coupling torque and the sum target creep torque, the functional module specifies a corresponding target torque for an electric drive motor of the secondary axle to compensate for the difference.

4 Claims, 2 Drawing Sheets

(52) U.S. Cl.
CPC .................. *B60W 2510/105* (2013.01); *B60W 2710/0666* (2013.01); *B60W 2710/083* (2013.01)

(58) Field of Classification Search
CPC ... B60W 2710/0666; B60W 2710/083; B60W 2520/263; B60W 2540/10; B60W 2720/403; B60W 10/06; B60W 10/08; Y02T 10/62; B60K 6/52; B60K 6/442
See application file for complete search history.

(56) References Cited

U.S. PATENT DOCUMENTS

| | | |
|---|---|---|
| 2014/0343774 A1 | 11/2014 | Wimmer et al. |
| 2015/0088356 A1 | 3/2015 | Sailer et al. |

FOREIGN PATENT DOCUMENTS

| | | |
|---|---|---|
| DE | 10 2009 038 553 A1 | 8/2010 |
| DE | 10 2012 211 920 A1 | 1/2014 |
| DE | 10 2013 208 965 A1 | 11/2014 |
| DE | 10 2013 219 085 A1 | 3/2015 |
| DE | 10 2019 219 041 A1 | 6/2020 |

OTHER PUBLICATIONS

German-language Written Opinion (PCT/ISA/237) issued in PCT Application No. PCT/EP2022/059826 dated Aug. 8, 2022 with English translation (9 pages).

German-language Search Report issued in German Application No. 10 2021 112 481.6 dated Dec. 22, 2021 with partial English translation (13 pages).

\* cited by examiner

CONTROLLER FOR OPERATING A ROAD-COUPLED HYBRID VEHICLE

BACKGROUND AND SUMMARY OF THE INVENTION

The invention relates to a control device for the operation of a road-coupled hybrid vehicle with at least one electronic control unit, with a first drive unit associated with a primary axle (rear axle or front axle) and with a second drive unit associated with a secondary axle (front axle or rear axle), wherein the drive unit of the primary axle has at least one internal combustion engine and a transmission and the drive unit of the secondary axle has at least one electric drive motor.

Various methods for operating a road-coupled hybrid vehicle are described, for example, in German patent applications 10 2012 211 920, 10 2013 208 965, and 10 2013 219 085.

For example, German patent application 10 2012 211 920 concerns a so-called road-coupled hybrid vehicle with at least one primary motor (for example, an electric motor), which acts as a drive motor on a first axle of the hybrid vehicle, and with a secondary motor (for example, an internal combustion engine), which acts as a drive motor on a second axle of the hybrid vehicle. The primary and secondary motors are not coupled in a drive-related manner via a clutch, but only via the wheels through the road. Such road-coupled hybrid vehicles are also referred to as "axle-split" or axle hybrid vehicles.

German patent applications 10 2012 211 920 and 10 2013 208 965 deal with methods for switching on the secondary motor.

The disclosure document DE 102008035451 A1 describes a method for the optimization of a hybrid vehicle by means of control of the power output of the electric motor in such a way that the power output of the combustion engine is controlled at an optimal load point for its operating state. At the same time, the total power of the hybrid vehicle remains constant. The total power of the vehicle can be increased by using the electric motor as a generator to charge the electric storage of the hybrid vehicle. Here, the load point of the combustion engine is regulated in such a way that it can be operated with as little fuel consumption as possible.

It is an objective of the invention to improve a hybrid vehicle of the type mentioned at the beginning with regard to the traction behavior when starting off.

This objective is achieved according to the invention by the subject-matter of the independent patent claims. Dependent patent claims are advantageous developments of the invention.

The control device according to the invention for the operation of a road-coupled hybrid vehicle is equipped with at least one electronic control unit, with a first drive unit associated with a primary axle and with a second drive unit associated with a secondary axle. The drive unit of the primary axle (for example, a hybrid axle, which has an electric motor in addition to the combustion engine) has at least one internal combustion engine and an automated transmission. The drive unit of the secondary axle (for example, a purely electric axle) has at least one electric drive motor. In particular, the control unit is configured by a corresponding functional module (computer program product) to receive a specified sum target creep torque as an input variable and a command to switch from single-axle mode to two-axle mode with a specified all-wheel drive factor. Subsequently, the control unit sets a specified target torque for the combustion engine of the primary axle according to the all-wheel drive factor. Furthermore, the control unit detects the resulting actual coupling torque of the transmission, which can be transmitted by the transmission control unit. If the functional module of the control unit detects a difference between the actual coupling torque and the sum target creep torque, it specifies a corresponding target torque for the electric drive motor of the secondary axis.

The invention is based on the following considerations:

The invention is intended to realize all-wheel drive creep of road-coupled axles without a longitudinal transfer box. In this case, coupling-based torque transfer takes place.

According to the invention, road-coupled hybrid vehicles as described above should be able to creep in two-axle mode (all-wheel drive mode) at least under specified conditions, for example, to avoid slip.

Without a transfer box, hybrid axles or axles with a starting clutch can be controlled in such a way that they only produce part of the torque of the drive demand and transfer it to the other axle by appropriate software programming.

In the case of axle-coupled drives, the creep torque is specified in particular by the transmission control unit and has so far always been 100% implemented by the coupled transmission axle (primary axle or hybrid axle).

So far, no creep in all-wheel drive or two-axle mode is provided for hybrid vehicles without longitudinal transfer boxes.

According to the invention, for example, the transmission control unit itself sends to the electronic control unit, which is intended for the central control of the torques of the drive units, a sum target creep torque and an actual torque which the clutch is currently delivering. This sum target creep torque is distributed by the electronic control unit as individual target torques to the hybrid axle and the e-axle.

The transmission control unit tries to control the clutch (es) in such a way that the "all-wheel" distributed target coupling torque is achieved from the sum target creep torque. However, if a difference remains, the E axle is actuated to compensate for this difference between the sum target creep torque and the actual coupling torque.

In other words, the transmission control unit of the electronic control unit (as a central drive unit or as a hybrid master) sends a sum target creep torque, which is divided between the two axles and sent back to the transmission as a partial target torque.

The transmission reports a currently transmitted coupling torque.

The hybrid master coordinates the difference between the sum target creep torque and the coupling torque on the second axle.

Due to a fixed all-wheel drive ratio or an all-wheel drive factor ("AWD factor") communicated by another system, the transmission control unit could not independently convert the complete sum target creep torque in the creep range; then the coupling torque is less than the sum target creep torque and the e-axle (electric motor of the secondary axle) provides the difference required for creep in all-wheel drive or two-axle mode.

The drive concept according to the invention is a road-coupled parallel drive ("axle-split"). Characteristic of this is a coupling between the electric motor on a first axle (electric axle) and an internal combustion engine (with an optional second, usually smaller, electric motor) on another axle (hybrid axle) exclusively via the road (no mechanical or electrical coupling). As an example, an exemplary embodiment is considered in this invention in which the internal combustion engine is located on the rear axle as the primary axle and the (first) electric motor on the front axle as the secondary axle. Likewise, the internal combustion engine can also be located on the front axle as the primary axle and the electric motor on the rear axle as the secondary axle.

Details of the invention are explained in more detail in the following exemplary embodiment based on the drawing. In the figures

DETAILED DESCRIPTION OF THE DRAWINGS

Figure 1:
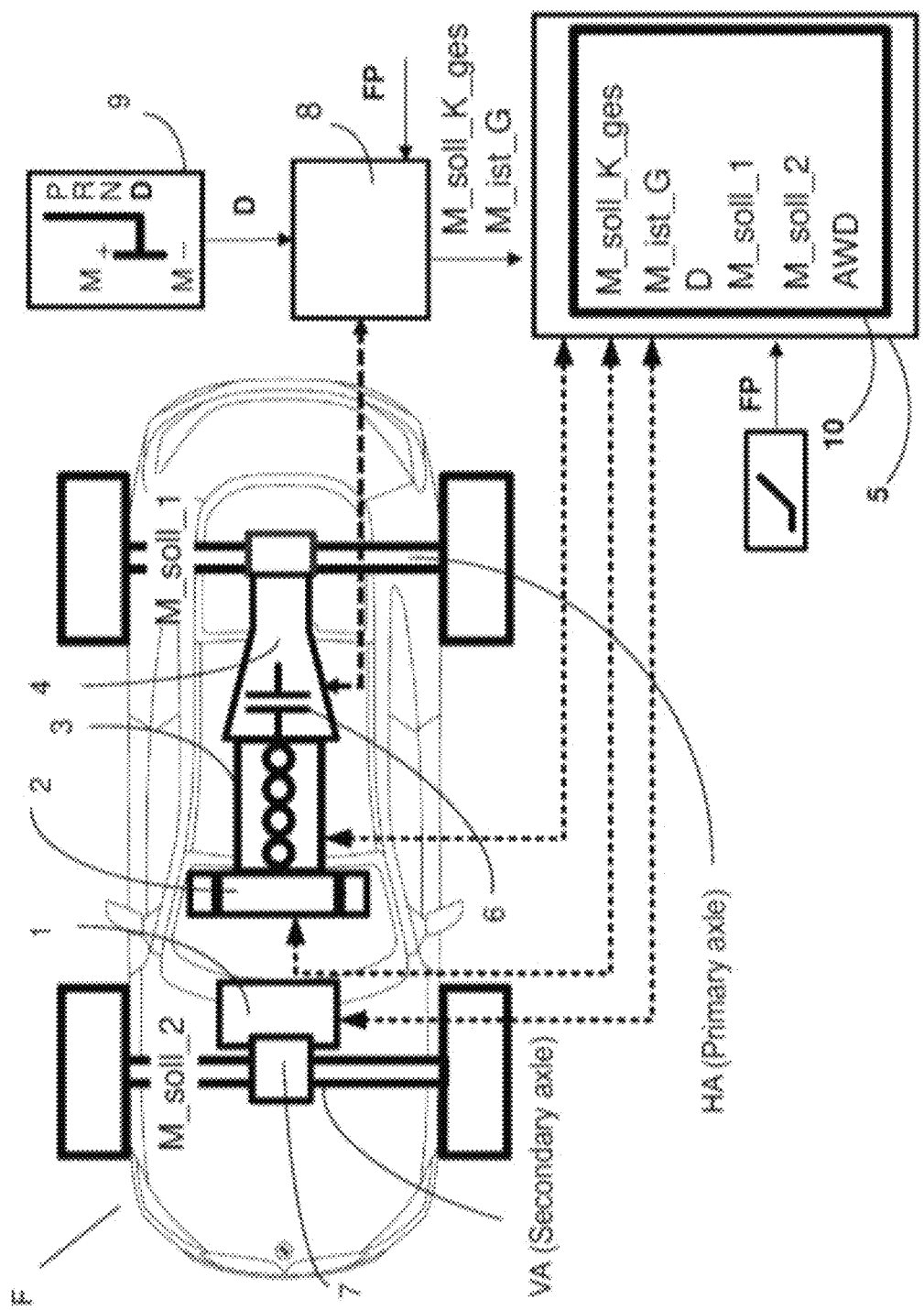
FIG. 1 shows a schematic representation of a road-coupled hybrid vehicle with the components essential for the control device according to the invention.

In FIG. 1 a so-called road-coupled hybrid vehicle F with a first electric drive motor 1 as the drive unit of the front axle VA (defined here as the secondary axle) and with an internal combustion engine 3 as a drive unit of the rear axle HA (defined here as the primary axle) are shown. The drive unit of the rear axle HA may contain a second electric motor 2 in addition to the internal combustion engine 3. Furthermore, an automatic transmission 4 (in particular a DCT transmission without a torque converter) with at least one controllable clutch 6 can be connected to the combustion engine 3 on the input side. Analogously, the invention is also applicable to a differently arranged sequence of the components 2, 3 and 4; for example, also for an arrangement in which the electric motor 2 is arranged between the internal combustion engine 3 and the automatic transmission 4. In another road-coupled hybrid vehicle according to the invention, the front axle VA could also be driven by an internal combustion engine and the rear axle by an electric motor. Finally, the hybrid vehicle has an electric energy storage device 7 which can be charged in particular when the electric drive motors 1 and/or 2 are operated regeneratively. A transmission control unit 8, which communicates with the electronic control unit 5 according to the invention, is associated with the transmission 4.

The method for controlling the operation of the hybrid vehicle is carried out by the electronic control unit 5, which has an appropriately programmed functional module 10 as well as connections to the necessary sensors and actuators. According to the invention, the functional module 10 is realized, for example, in the form of a software program part (computer program product), the design and functioning of which will be discussed in more detail by the description of FIG. 2.

Figure 2:
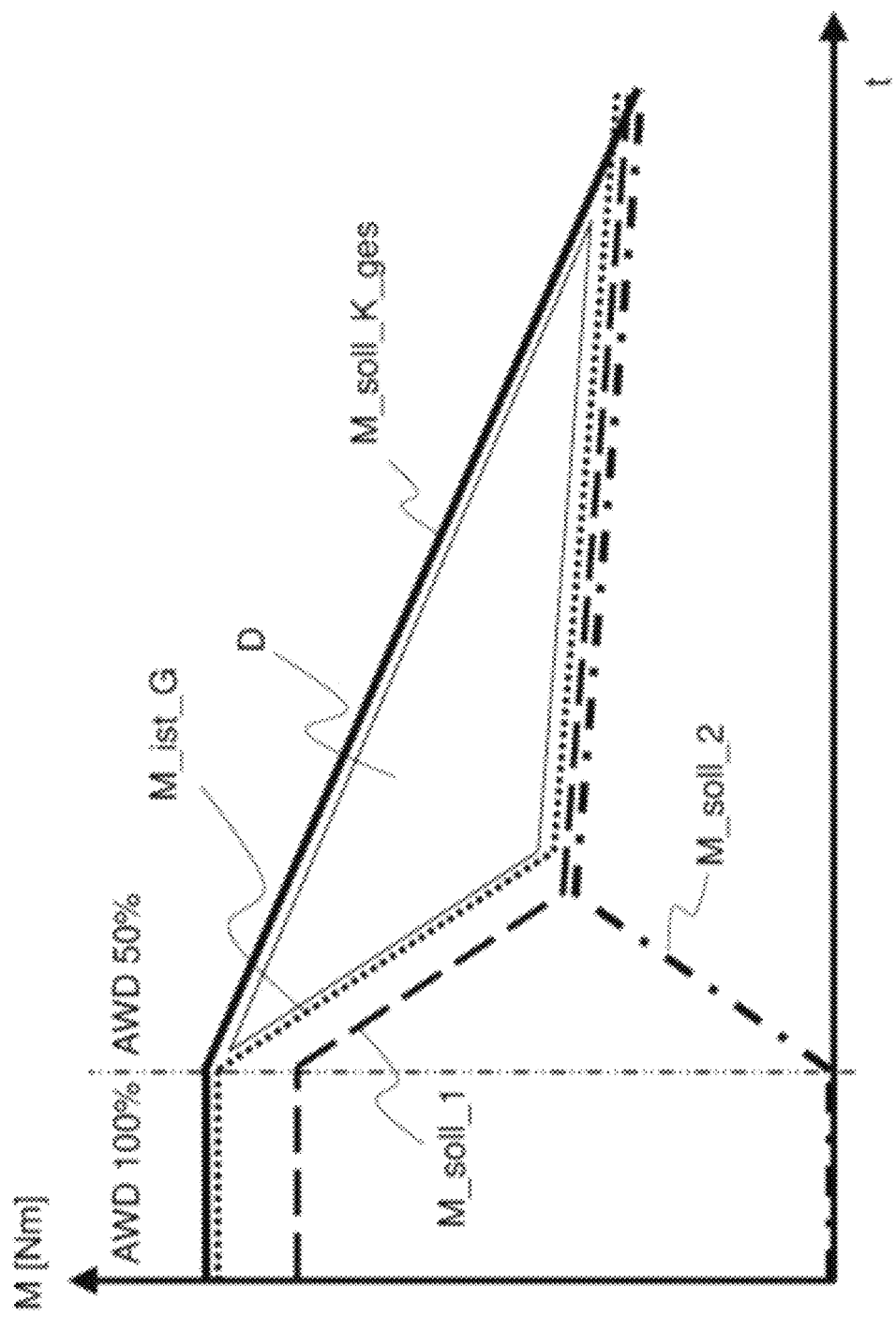
FIG. 2 shows a diagram of the operation of the method that can be carried out by the electronic control unit according to the invention.

FIG. 2 shows the relationships between the parameters that are processed by the electronic control unit 5 according to the invention: The sum target creep torque M_soll_K_ges is specified, for example by the transmission control unit 8. If the coupling torque M_ist_G in the transmission 4 cannot be controlled by the nominal torque M_soll_1 of the primary drive 3 (and possibly 2) to reach the sum target creep torque M_soll_K_ges, the target torque M_soll_2 of the secondary drive 1 compensates for the difference D of the actual coupling torque M_ist_G and the sum target creep torque M_soll_K_ges.

Preferably, the sum target creep torque M_soll_K_ges is specified by the transmission control unit 8 if the electronic control unit 5 generates a command to change from the all-wheel drive factor 100%—i.e., from the single-axle mode with the primary axle HA—to a two-axle or all-wheel drive mode (for example, 50%).

In Other Words:

In the case of a control device for the operation of a road-coupled hybrid vehicle with at least one electronic control unit 5, with a first drive unit 2 (and, if applicable, 3) associated with a primary axle HA and with a second drive unit 1 associated with a secondary axle VA, the drive unit of the primary axle HA has at least one internal combustion engine 3 and an automatic transmission 4 with an automatically controllable clutch 6 and the drive unit of the secondary axle VA has at least one electric drive motor 1. The control unit 5 is configured to receive a specified sum target creep torque M_soll_K_ges as the input variable and to receive a command to switch from single-axle mode to two-axle mode with a specified all-wheel drive factor (AWD). Subsequently, the control unit 5 uses an appropriately programmed functional module 10 according to the all-wheel drive factor AWD to set a predetermined torque M_soll_1 for the internal combustion engine 3 of the primary axle HA. Furthermore, the control unit 5 records the resulting actual coupling torque M_ist_G of the transmission 4, which is transmitted by the transmission control unit 8. If the functional module 10 detects a difference D of the actual coupling torque M_ist_G and the sum target creep torque M_soll_K_ges, it specifies a corresponding torque M_soll_2 for the electric drive motor 1 of the secondary axle VA to compensate for this difference D.

Preferably, the sum target creep torque M_soll_K_ges is specified by the transmission control unit 8 with the accelerator pedal FP not operated and with a driving position "D" or "R" of a selector switch 9 connected to the transmission control unit 8.

In particular, the command to switch from single-axle mode to two-axle mode with a specified all-wheel drive factor AWD is generated when slip occurs while at a standstill.

The invention claimed is:

1. A control device, including at least one electronic control unit, for operation of a road-coupled hybrid vehicle, including a first drive unit associated with a primary axle and a second drive unit associated with a secondary axle, wherein the first drive unit of the primary axle has at least one internal combustion engine and an automated transmission and the second drive unit of the secondary axle has at least one electric drive motor, and wherein the at least one electronic control unit is configured to:
   receive a specified sum target creep torque as an input variable and a command to switch from single-axle mode to two-axle mode with a specified all-wheel drive factor,
   subsequently set a specified torque at least for the at least one internal combustion engine of the primary axle and to record a clutch torque of the automated transmission, and
   when a difference of the clutch torque and the sum target creep torque is detected, compensate the difference by a specified torque for the at least one electric drive motor of the secondary axle,
   wherein the command to switch from single-axle mode to two-axle mode with the specified all-wheel drive factor is generated when slip occurs while the road-coupled hybrid vehicle is at a standstill.

2. The control device according to claim 1, wherein the sum target creep torque is specified by a transmission control unit when an accelerator pedal of the road-coupled hybrid vehicle is not operated.

3. A non-transitory computer-readable medium storing a program for a control device, including at least one electronic control unit, for operating a road-coupled hybrid vehicle including a first drive unit associated with a primary axle and a second drive unit associated with a secondary axle, wherein the first drive unit of the primary axle has at least one internal combustion engine and an automated transmission and the second drive unit of the secondary axle has at least one electric drive motor, wherein the program causes the at least one electronic control unit to:
- receive a specified sum target creep torque as an input variable and a command to switch from single-axle mode to two-axle mode with a specified all-wheel drive factor,
- subsequently set a specified torque at least for the at least one internal combustion engine of the primary axle and to record a clutch torque of the automated transmission, and
- when a difference of the clutch torque and the sum target creep torque is detected, compensate the difference by a specified torque for the at least one electric drive motor of the secondary axle,
- wherein the command to switch from single-axle mode to two-axle mode with the specified all-wheel drive factor is generated when slip occurs while the road-coupled hybrid vehicle is at a standstill.

4. A road-coupled hybrid vehicle comprising:
- a control device, including at least one electronic control unit;
- a first drive unit associated with a primary axle; and
- a second drive unit associated with a secondary axle;
- wherein the first drive unit of the primary axle has at least one internal combustion engine and an automated transmission and the second drive unit of the secondary axle has at least one electric drive motor; and
- wherein the at least one electronic control unit is configured to:
- receive a specified sum target creep torque as an input variable and a command to switch from single-axle mode to two-axle mode with a specified all-wheel drive factor,
- subsequently set a specified torque at least for the at least one internal combustion engine of the primary axle and to record a clutch torque of the automated transmission, and
- when a difference of the clutch torque and the sum target creep torque is detected, compensate the difference by a specified torque for the at least one electric drive motor of the secondary axle; and
- wherein the command to switch from single-axle mode to two-axle mode with the specified all-wheel drive factor is generated when slip occurs while the road-coupled hybrid vehicle is at a standstill.

* * * * *